United States Patent [19]

Grupp et al.

[11] Patent Number: 4,738,500
[45] Date of Patent: Apr. 19, 1988

[54] ELECTROMAGNETICALLY DRIVEN OSCILLATING MIRROR

[75] Inventors: Manfred Grupp, Königsbronn; Horst Stacklies, Aalen, both of Fed. Rep. of Germany

[73] Assignee: Carl-Zeiss-Stiftung, Heidenheim, Fed. Rep. of Germany

[21] Appl. No.: 924,267

[22] Filed: Oct. 29, 1986

[30] Foreign Application Priority Data

Nov. 2, 1985 [DE] Fed. Rep. of Germany ....... 3538898

[51] Int. Cl.⁴ ............................................. G02B 26/10
[52] U.S. Cl. ...................................... 350/6.6; 350/6.5; 350/486; 33/1 PT
[58] Field of Search ................. 350/6.6, 6.1, 6.5, 6.91, 350/486, 487, 634, 637; 33/1 PT

[56] References Cited

U.S. PATENT DOCUMENTS

| | | | |
|---|---|---|---|
| 3,654,553 | 4/1972 | Mary et al. | 350/486 |
| 4,021,096 | 5/1977 | Dragt | 350/6.91 |
| 4,073,567 | 2/1978 | Lakerveld et al. | 350/486 |
| 4,393,591 | 7/1983 | Conta | 33/1 PT |
| 4,495,700 | 1/1985 | Ernst | 33/1 PT |
| 4,613,203 | 9/1986 | Proetel et al. | 350/6.6 |
| 4,636,792 | 1/1987 | Watson | 33/1 PT |

*Primary Examiner*—John K. Corbin
*Assistant Examiner*—Loha Ben
*Attorney, Agent, or Firm*—Walter Ottesen

[57] ABSTRACT

An electromagnetic drive system drives the oscillating secondary mirror or wobble mirror of a reflecting telescope. The driving force of the drive system is directly proportional to the current and the drive system is digitally controllable. By incorporating a tachometer generator and a contactless operating position measuring unit, it is possible to select such function curves for the leading and trailing edges of the wobble function which will permit a jolt-free drive of the mirror.

4 Claims, 4 Drawing Sheets

ELECTROMAGNETICALLY DRIVEN OSCILLATING MIRROR

FIELD OF THE INVENTION

The invention relates to an electromagnetic drive system which includes at least one permanent magnet mounted on an arm guided for reciprocating movement. The permanent magnet has a polarity (N-S) which is directed transversely to the direction of movement of the arm on which it is supported. The drive system further includes at least one coil pair whose field coils are each mounted on a magnetic return plate with these plates being adapted to the path of the movement of the permanent magnet with respect to their form. These plates are fixedly mounted directly opposite each other on respective sides of the path of movement of the permanent magnet.

BACKGROUND OF THE INVENTION

A drive system of this kind is disclosed in German patent publication No. DE 27 28 824 C3. The drive system is here utilized for moving the diaphragm leaves and/or the shutter sectors of a photographic camera shutter.

Electromagnetic drive systems are utilized as drive systems for the oscillatory movement of a secondary mirror of a reflecting telescope. The secondary mirror is referred to as a wobble mirror in the following. The electromagnetic drive systems contain magnetic coil systems having magnetic cores which define air gaps with magnetic armatures. The air gaps have a magnitude which is dependent upon the rotational angle of the mirror arrangement. Such drive systems are disclosed in German patent publication No. DE 32 13 076 A1. The disadvantages of this known drive system for wobble mirrors of mirror telescopes are that: the occurring tension forces are greatly dependent on the air gap and therefore are very difficult to compute mathematically; manufacturing tolerances greatly influence the system; and, the force acts only in one direction. Mechanical springs are therefore utilized for returning the unit to the starting position and these springs, in turn, greatly influence the course of the frequency.

SUMMARY OF THE INVENTION

It is therefore an object of the invention to provide a drive system for the wobble mirror of a reflecting telescope which exhibits fast reaction times, permits a simple mathematical description of the system and does not require a mechanical coupling.

This object is attained in that a drive system known for a photographic camera shutter is utilized as a linear drive system for the oscillatory movements of the wobble mirror of a reflecting telescope about a rotational axis.

In an advantageous embodiment of the invention, a position measuring system and a tachometer generator are provided supplementary to the drive system. The position measuring system comprises, for example, a contactless operating position measuring device which is commercially known as a "transducer". This position measuring device detects the instantaneous actual position of the mirror during its movement. The tachometer generator is configured similarly to the drive system but has a higher number of turns of the coil in order to increase the induced voltage.

In a further advantageous embodiment, the linear drive system is utilized to move a secondary mirror about two axes. For this purpose, the mirror is attached to a rotational joint which is centrally mounted in an imaginary spherical dish and the linear drive system is so configured that it defines a part of the imaginary spherical surface of the dish.

The advantages achieved with the invention are especially seen in that: the drive force of the linear drive system is directly proportional to the current; the mechanical system with the spring constant of the rotary joint and the mass moment of inertia of the moved mass can be easily defined; and, the movable mass is completely decoupled mechanically from the drive system whereby the occurring disturbing influences brought about by friction, bearing forces and stress are prevented. Furthermore, the geometry of the air gap does not change during the movement. Another advantage is seen in that the drive system utilized permits the selection of desired modulation functions.

BRIEF DESCRIPTION OF THE DRAWING

The invention will now be described with reference to the drawing wherein:

FIG. 1a is a partial side elevation view of the wobble mirror taken along the line Ia—Ia of FIG. 1b; FIG. 1b is a partial side elevation view of the wobble mirror when viewed along line Ib—Ib of FIG. 1a; and, FIG. 1c is a plan view of the wobble mirror arrangement with a portion of the mirror broken away to show the lower part of the arrangement;

DESCRIPTION OF THE PREFERRED EMBODIMENTS OF THE INVENTION

Figure 1C:
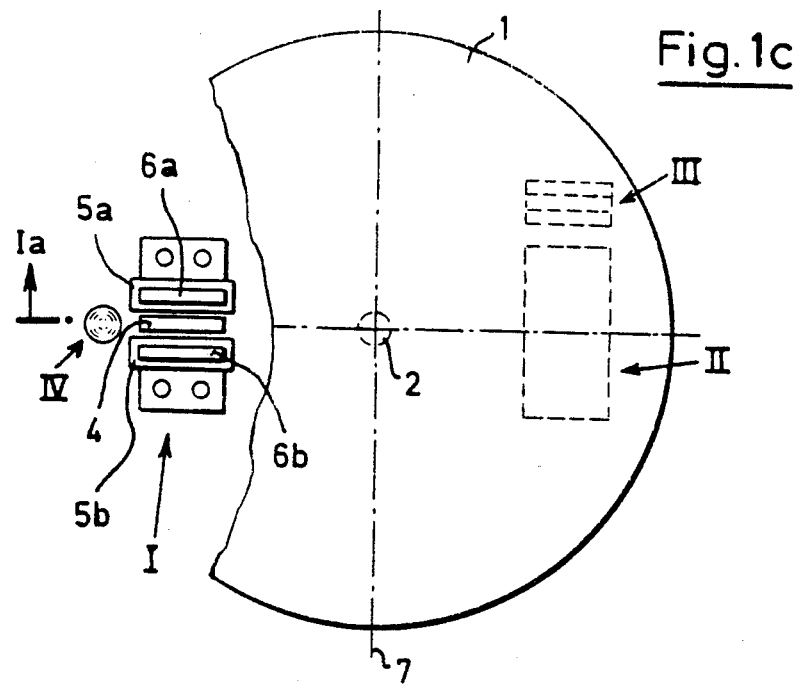
FIGS. 1a to 1c show a schematic representation in three views of the arrangement according to the invention of a linear drive system for the wobble mirror of a reflecting telescope; more specifically.
Figures 1A, 1B:
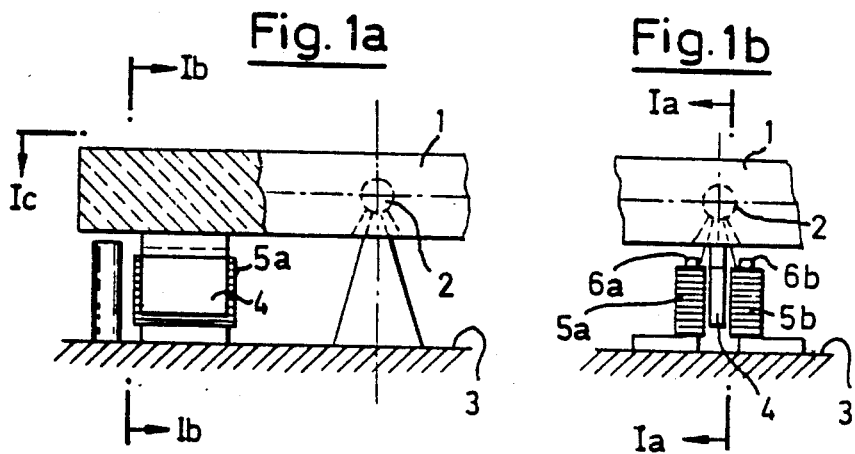

Referring to FIGS. 1a to 1c, the wobble mirror is indicated with reference numeral 1 and the outline of the rotational joint is indicated by reference numeral 2. The rotational joint 2 is fixedly mounted to the base 3. The drive system includes a permanent magnet 4 arranged between electrical field coils 5a and 5b. Iron cores 6a and 6b are disposed in corresponding ones of field coils 5a and 5b.

In FIG. 1c, a portion of the wobble mirror is broken away to expose the drive element I disposed to the left of the rotational joint 2. Reference numeral II identifies a second drive system mounted symmetrically on the right side for increasing the drive force. A linear tachometer III is also provided and is configured according to the same principle as the two drive systems I and II; however, the linear tachometer III has a higher number of coils. A position measuring system is identified by IV and is commonly known as a transducer. The position measuring system IV detects the actual position of the wobble mirror without having any contact therewith.

Figure 2:
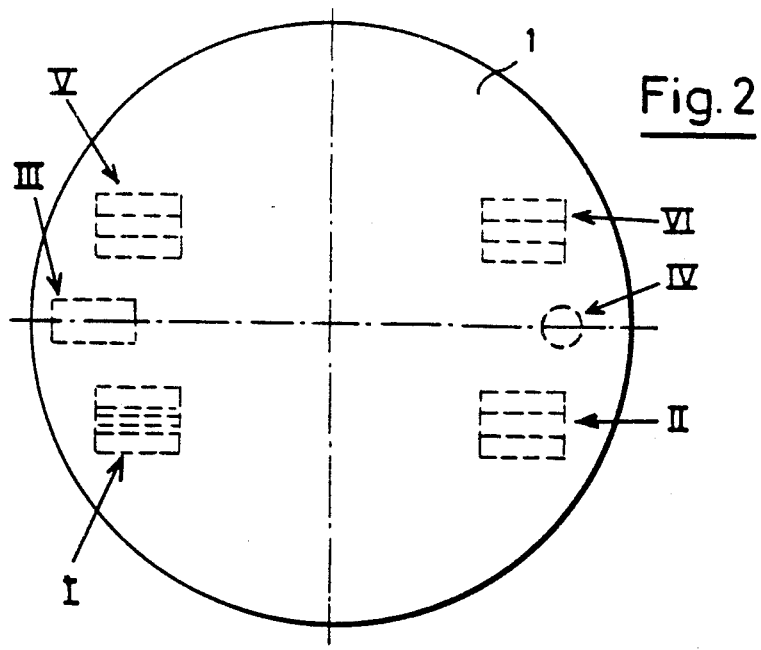
FIG. 2 is a schematic representation in plan view of a wobble mirror arrangement having four linear drive systems mounted symmetrically with respect to the rotational axis.

FIG. 2 shows four drive systems I, II, V and VI mounted symmetrically to the rotational axis 7 of the wobble mirror 1. Reference numerals III and IV again indicate a linear tachometer and a position measuring system, respectively. The arrangement of four drive systems on the wobble mirror distributes the driving force over four points. The force acting in this manner leads to a lower deformation of the surface of the mirror.

Figure 3:
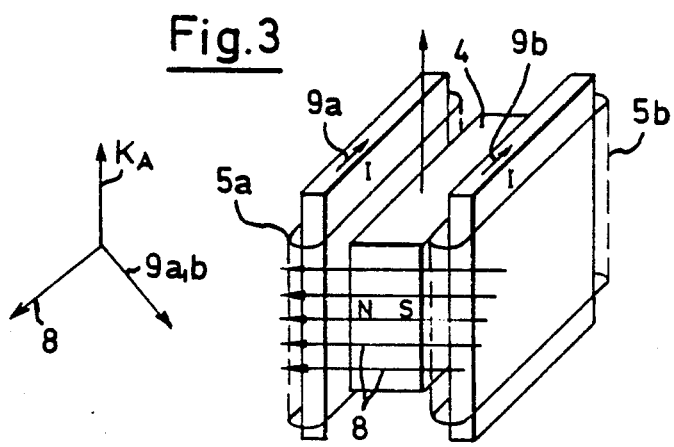
FIG. 3 shows the operation of the linear drive system utilized for the wobble mirror.

FIG. 3 illustrates the operation of the drive system wherein the course of the field lines of the permanent magnet 4 is indicated by reference numeral 8. The current I in the coils 5a and 5b flows in the direction indicated by reference numerals 9a and 9b respectively. The direction of the force $K_A$ generated by the drive system is directed perpendicularly upwardly for the predetermined directions 9a and 9b of the current I and the direction 8 of the field of the permanent magnet.

Figure 4:
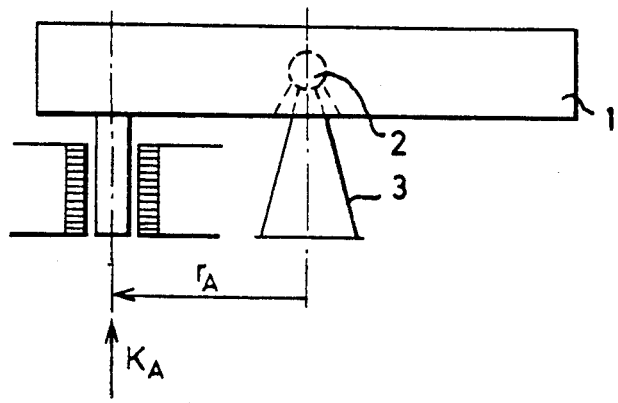
FIG. 4 is a simplified system schematic to facilitate visualization of the moment equations.

The moment equations can be derived from the simplified system illustration of FIG. 4. If $K_A$ indicates the direction of the driving force and if the remaining quantities are as delineated below:

B = the air gap induction;
l = the length of the conductor in the air gap;
I = the electrical current;
$r_A$ = the lever arm;
C = the spring constant of the mirror rotational joint;
$\Phi$ = the deflection angle of the mirror;
$\theta$ = mass moment of inertia of the mirror; and,
$\ddot{\Phi}$ = the angular acceleration;

then the following moment equations are realized:

Drive moment $M_A = M_\Phi + M_\theta$
Drive moment $M_A = B \cdot l \cdot I \cdot r_A$
Moment $M_\Phi = C \cdot \Phi$
Moment $M_\theta = \theta \cdot \ddot{\Phi}$
Drive force $K_A = B \cdot l \cdot I$ From these moment equations, it can be recognized that the drive force $K_A$ of the linear drive system which is used is directly proportional to the current and that the mechanical system with the spring constant of the rotational joint and the mass moment of inertia of the moved mass are very easily defined.

With such a system configuration, the moved mass is completely decoupled mechanically so that there are no disturbing influences introduced by friction, bearing forces and stresses. A rotational movement about an axis is easily generated also for large rotational angles with this drive system.

Figure 5:
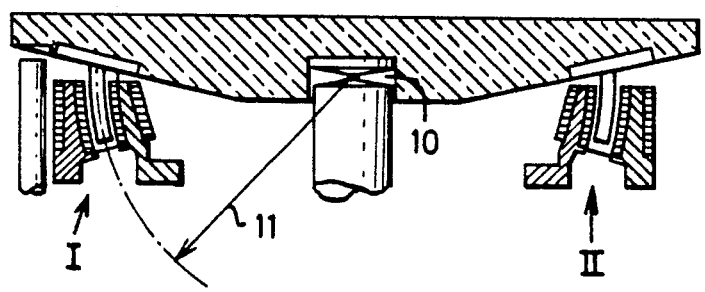
FIG. 5 is a schematic representation of another embodiment of the arrangement of the drive system for a wobble mirror oscillating about two rotational axes; and, FIG. 6 is a block diagram of an electronic circuit of the drive system for a wobble mirror oscillating about two rotational axes.

In FIG. 5, the wobble mirror 1 is attached to the rotational joint 10 which is at the center point of an imaginary sphere having radius 11. The four drive systems of which I and II are shown in FIG. 5 are so arranged and configured that they define a part of the surface of the sphere.

Since the drive system is made up of two independent windings, the drive system can be advantageously so configured that one winding can be utilized for generating the drive force while the other winding with modified coil data can serve as the tachometer generator.

Figure 6:
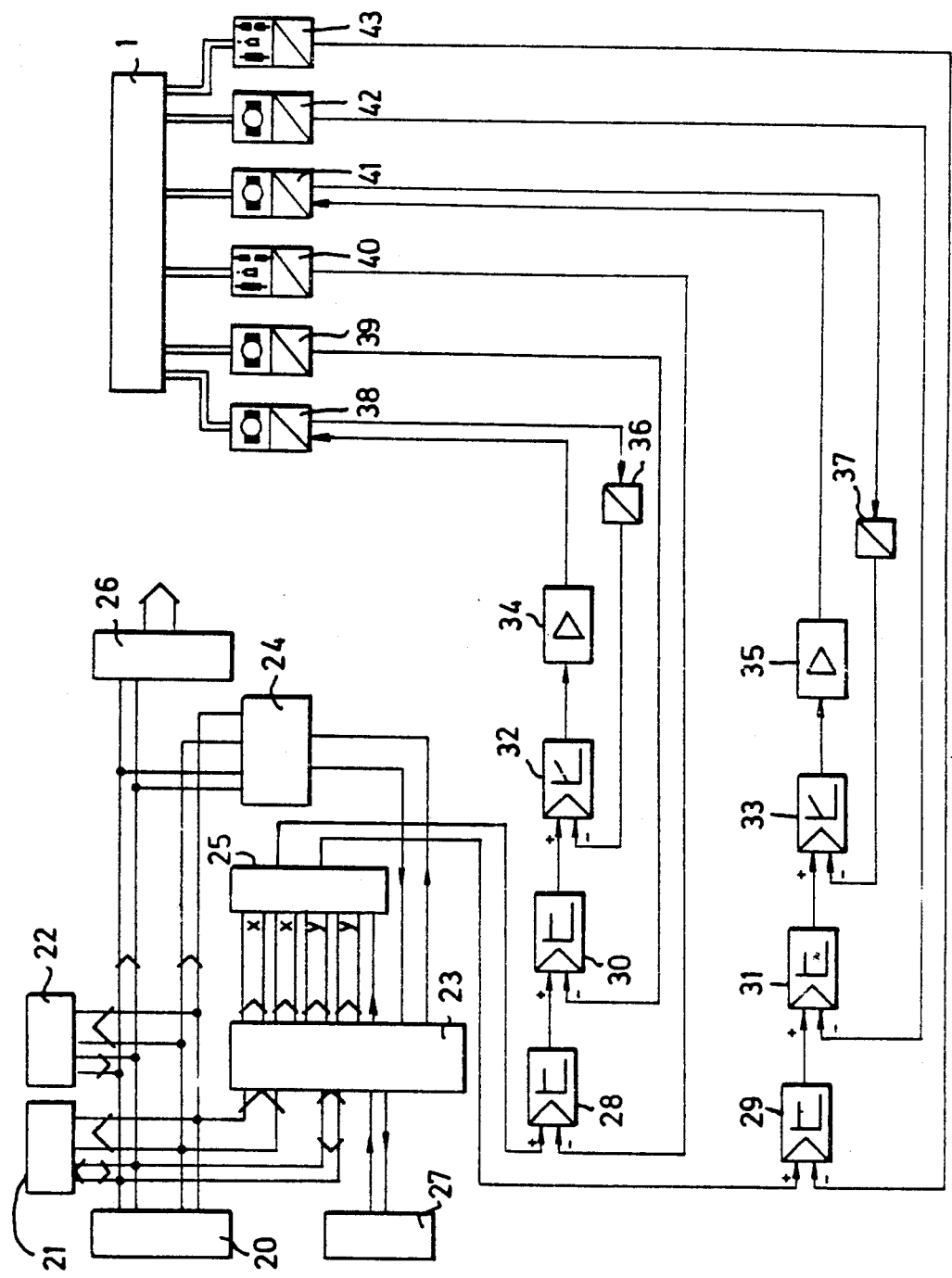

The block diagram shown in FIG. 6 shows a possible drive for the drive system utilized for the wobble mirror and the configuration of the electronic control system for a two-axis control. With the aid of a microcomputer and of a digital-to-analog converter, very simple function curves for driving a control system can be generated. One would select those functions which make possible a jolt-free operation of the pivotal mirror system. The control of the system is effected via a cascaded control system with the aid of signal transmitters for the path, the velocity and for the current at the mirror 1. The electronic arrangement is subdivided into the following sets of components:

(a) digital electronic components with microcomputer means and peripheral electronic components;
(b) analog electronic components with two cascaded control loops for a two-axis control; and,
(c) a mirror with linear drive systems and signal transmitters.

The above items (a) to (c) will now be considered individually.

Item (a)

The digital electronic components include a microprocessor 20, data and program storage (21, 22), a parallel-series interface unit 23, a control pulse component 24, a double digital-to-analog converter 25, and interface units 26 and 27 for entering data and transferring data. The microcomputer computes the optimal or desired modulation function and delivers the desired function as an analog voltage to the particular cascaded control via the digital-to-analog converter 25.

Item (b)

The analog electronic components comprise two cascaded control loops with the controllers 28 and 29 for the position (deflection), the controllers 30, 31 for the velocity and the controllers 32, 33 for the acceleration proportional to the drive current. The power amplifiers 34, 35 serve to drive the linear drive systems 38, 41. Such a system configuration affords the advantage of a control with high precision and velocity with good stability.

Item (c)

The linear drive systems 38, 41 on the mirror 1 are provided for respective axes. The current through these linear drive systems are transformed into a voltage proportional to the current by means of the elements 36, 37 and this voltage serves as acceleration feedback for the controllers 32, 33, respectively.

The linear tachometer generators 39, 42 act as signal transmitters at the mirror 1 for the feedback of a voltage proportional to velocity for the controllers 30, 31, respectively. The elements 40, 43 detect the mirror position (deflection) and supply a voltage proportional to the deflection to the controllers 28, 29, respectively, in the form of a feedback.

It is understood that the foregoing description is that of the preferred embodiments of the invention and that various changes and modifications may be made thereto without departing from the spirit and scope of the invention as defined in the appended claims.

What is claimed is:

1. An electromagnetic drive system for a wobble mirror of a reflecting telescope, the wobble mirror being mounted for oscillatory movement with respect to a base and along a path in a predetermined direction about at least one rotational axis, the electromagnetic drive system comprising:

a permanent magnet attached to said wobble mirror for moving back and forth along said path and for developing a magnetic field having an N-S polarity directed transversely to said path;

a field coil assembly for coacting with said permanent magnet for driving said wobble mirror, the field coil assembly including: two magnetic iron cores fixedly mounted on said base and a arranged on respective sides of said path so as to be directly adjacent each other, said iron cores being shaped so as to be adapted to said path; two field coils mounted on respective ones of said iron cores; and current supply means for supplying current to said field coils for coacting with said field of said permanent magnet to generate a force for rotating said wobble mirror about said axis;

control means for driving said field coil assembly;

position measuring means for detecting the instantaneous actual position of said mirror and supplying a signal indicative of said position to said control means; and, tachometer-generator means for detecting the velocity of said mirror and supplying a signal indicative of said velocity to said control means.

2. The electromagnetic drive system of claim 1, said tachometer-generator means comprising:

a permanent magnet mounted on said mirror for movement therewith; and, a field coil assembly mounted on said base for coacting with said permanent magnet to generate said signal indicative of said velocity.

3. The electromagnetic drive system of claim 2 further comprising: rotational joint means for mounting said wobble mirror for rotational movement about two axes and for defining the center of an imaginary dish defining a spherical surface; said permanent magnet being configured for movement in said surface and said field coils and said iron cores being configured with reference to said surface so as to accommodate the movement of said permanent magnet.

4. An electromagnetic drive system for imparting oscillatory movement to a wobble mirror of a reflecting telescope, the system comprising:

a base;

rotational joint means for mounting said wobble mirror for rotational movement with respect to said base about at least one axis and along a path in a predetermined direction;

a permanent magnet mounted on said wobble mirror for movement along said path and for developing a magnetic field having an N-S polarity directed transversely to said path;

field coil means defining an air gap and being adapted to said path for accommodating said permanent magnet in said air gap;

current supply means for supplying current to said field coil means for coacting with said field of said permanent magnet to generate a force for rotating said wobble mirror about said axis;

control means for driving said field coil means;

position measuring means for detecting the instantaneous actual position of said mirror and supplying a signal indicative of said position to said control means; and, tachometer-generator means for detecting the velocity of said mirror and supplying a signal indicative of said velocity to said control means.

* * * * *